Dec. 16, 1924.
P. LIGHT
OPENER
Filed Feb. 12, 1923
1,519,495
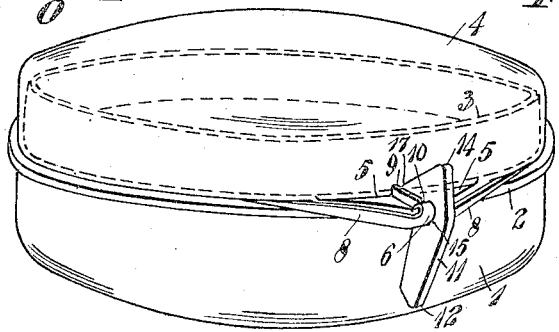
Fig. 1.
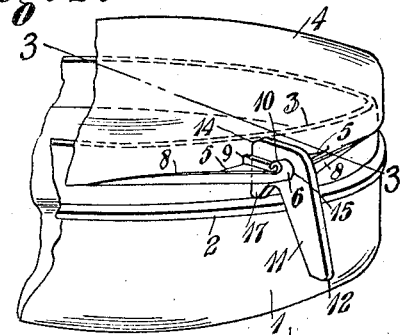
Fig. 2.
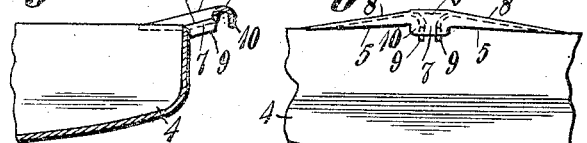
Fig. 4. Fig. 5.
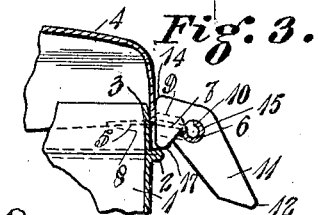
Fig. 3.
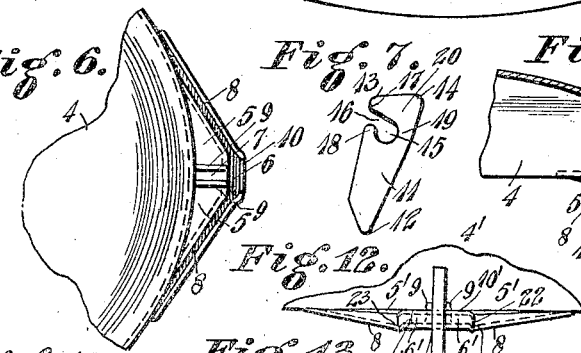
Fig. 6. Fig. 7. Fig. 8.
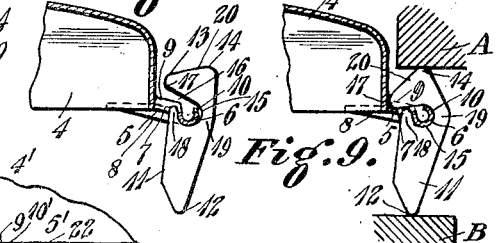
Fig. 9.
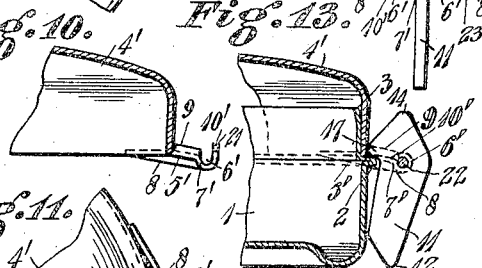
Fig. 10. Fig. 12. Fig. 13.
Fig. 11. Fig. 14.
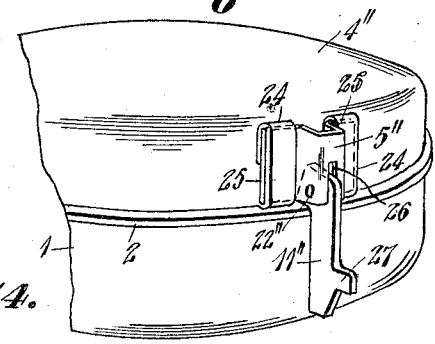
Fig. 15.
Fig. 16.
Inventor
Peter Light
By
Clarence Perdew
Attorney.

Patented Dec. 16, 1924.

1,519,495

UNITED STATES PATENT OFFICE.

PETER LIGHT, OF CINCINNATI, OHIO.

OPENER.

Application filed February 12, 1923. Serial No. 618,601.

*To all whom it may concern:*

Be it known that I, PETER LIGHT, a citizen of the United States, residing at Cincinnati, in the county of Hamilton and State of Ohio, have invented certain new and useful Improvements in Openers, of which the following is a specification.

My invention relates to devices which are mounted on containers, such as boxes, cans or jars, to afford a convenient means for loosening the closure thereof; and its object is to provide a simple inexpensive but strong and effective opener of this kind which will not involve puncture of the walls of the container or its closure, and which will not become jammed or locked upon reclosure. Other objects will appear in the course of the ensuing description.

I attain these objects by the device illustrated, for example, in the accompanying drawing, in which—

Figure 1 is a perspective view of a container provided with my invention, in closed condition;

Fig. 2 is a partial similar view showing the lid of the container raised on the container by my invention;

Fig. 3 is a partial sectional view on the vertical plane of the line 3—3 of Fig. 2;

Fig. 4 is a partial sectional view of the lid, on the same plane as in Fig. 3, but with the lid inverted as it is formed by the punches and dies, before the lever is applied;

Fig. 5 is a partial front elevation of the same;

Fig. 6 is a partial bottom plan view of the same, or, as the lid will be used, a top plan view thereof;

Fig. 7 is a side elevation of the lever before application to the lid;

Fig. 8 is a section similar to Fig. 4, but with the lid turned right side up and with the lever in process of application thereto;

Fig. 9 is a similar view showing the final step in applying the lever to the lid;

Fig. 10 is a sectional view similar to Fig. 4, showing a modified lid, right side up;

Fig. 11 is a plan view of the same, looking from the top of the lid;

Fig. 12 is a front elevation of this modified lid with a modified lever applied thereto;

Fig. 13 is a vertical section similar to Fig. 3, of this modified lid and lever on the box, closed;

Fig. 14 is a top plan view of the same;

Fig. 15 is a partial perspective view similar to Fig. 1 but showing a second modification of the lid and lever; and Fig. 16 is a partial perspective view of the lid of Fig. 16, in process of application of the lever and its mounting thereto.

As shown in Figs. 1 to 9, inclusive, the circular shallow cup-shaped box 1, such as commonly used for shoe polish, for instance, has the annular exterior bead 2 some distance down from its rim 3, which is slightly turned in, usually, to facilitate slipping the lid 4 on over the rim 3 down against the bead 2. This lid 4, circular inverted-cup shaped, has its depending rim fitting tightly around and against the box for some distance up from the bead 2, to make the container as nearly air tight as possible. Shoe polish, for instance, contains spirits, oils or other more or less volatile substance, drying out quickly unless air is excluded from the container. And such of the material as adheres to the side of the box above the bead 2, or inside of the lid fitting therearound, thus drying, tends to adhesively secure the lid on the box, so that, especially after use, the lid becomes very hard to remove. These conditions, of course, are well known, and various attachments have been provided to facilitate the opening of such boxes. Some have rivets through the lids or boxes, as pivots, so that working them loosens them and forms air inlets. Attempts to provide supports not cutting through the box or lid walls have resulted in displacement of the operating parts of the devices, making them very undependable. To solder such supports is prohibitive for boxes that must be so inexpensive. These boxes are of rather thin sheet metal, so that rivets, or bent up lugs of the metal, cannot be very substantial; and as the coacting part, such as the rim 2, is comparatively narrow, slight displacement of such devices usually results in the device slipping off the part and failing to open the box. As a box of shoe polish, for instance, is opened and closed quite many times before emptied, such an opener should have considerable durability.

The lid 4, in my invention, has merely a plain edged rim, except for a considerable extent at one side, where it has an extension, integral with the sheet metal of the lid, forming two lip parts 5 spaced transversely, but, in this example, integrally joined at their outer ends by a pivot part 6, so that a slot 7 is left from this part 6 inward to the lid rim.

As this rim must fit down very close to the bead 2, this extension is sharply bent out at its junction with the main rim part; but preferably is sloped down in its radially outward extent at a moderate angle. This slope is permitted without obstructing the complete seating of the lid because the bead 2 is substantially half-circular in cross-section along its periphery, being a fold of the box metal.

The metal of the lids 4 is so thin, in the class of containers referred to, that a merely plain narrow lip would not afford the stiffness needed. I provide this stiffness by extending each lip part 5 a substantial distance around the lid rim, so that its junction not only is long, but follows a curved line, that of the rim circumference. The greater distortion of the metal to form this junction hardens the metal; and causes each part of the curve to act as a brace for every other part. This leaves the lip parts 5 free to bend only on straight lines tangent to this curve; and the resistance there is provided by ribs 8, of semicircular cross section, embossed in the lip metal along the edges that extend divergingly radially inward from the pivot part 6 to the lid rim, which they meet substantially at a tangent. These ribs decrease in depth inward, to have no appreciable projection below the rim over the bead 2; but it will be seen that any straight line upon which the lips could bend must cut one or both of these ribs 8 out far enough from the lid for the rib to have ample depth. Additionally, ribs 9 are formed along the edges of the slot 7, with their inner ends preferably abutting the side of the lid rim; so that any line of bending must cross at least three ribs.

The pivot part 6, as shown, is a continuation of and junction between the outer edge ribs 8, preferably of slightly increased diameter; and its extreme outer part is much deeper, forming a tongue 10. This entire pivot part is somewhat longer than is the width of the slot 7, and symmetrical thereto.

The entire cup-shaped lid 4 and its lip parts 5 with their ribs 8 and 9 and the pivot part 6 with its tongue 10 is formed from a single sheet by a single operation of a press upon a compound die and punch which blanks and cups the lid as usual, forms the lip parts 5 with their ribs and pivot part 6, and cuts the slot 7 defining those parts; the ribs 9 being formed by the metal displaced to form the slot merely by slitting along a median line without removal of any metal, and bending the slit apart sections outward. This lid thus is formed in the press, inverted, as in Fig. 4; so that these ribs 9 are forced down, and the embossing of the ribs 8 is by bending the metal down over raised convex ribs on the die, with the tongue 10 formed vertical, parallel with the lid rim.

The lever 11 is a simple punching from sheet metal considerably thicker than the box and lid metal, wider at its top end than at its lower end, and with these ends diverging outward at a high angle so that the lower end has a tip 12 at an acute angle, and the upper end has a corner 13 at an obtuse angle and a corner 14 at an acute angle. All of these parts, 12, 13 and 14, however, are rounded slightly, to facilitate punching and to avoid sharpness in use. A short distance down from the upper end, a recess is cut in from the inner edge, comprising a round opening 15 with a narrow opening 16 leading therefrom out through the edge, the upper side of this opening being substantially straight and tangent to the round part, and merging into the obtuse upper corner of the piece in a slight curve, so that a nose 17 is formed. At the lower side of the opening 16 a narrow lug 18 thus is left; and the narrow part of the piece left between the round opening 15 and the outer edge forms a neck 19 that bends edgewise more readily than the wider upper and lower parts which it joins, so that a light blow against the top corner 14 down and inward will tilt the upper wide part or head 20 inward and down until it stops against the lug 18, whereupon the nose 17 will project inward some distance past the inner edge of the lower part of the lever. The lever, as described, before this bending, is clearly shown in Fig. 7.

This lever is applied to the lid 4 with the pivot part 6 of the lid extension passing in through the narrow opening 16, the lid having been turned right side up, and the lower convex side of the part 6 resting down in the round opening 15. This round opening is large enough to admit the upstanding tongue 10 with little or no distortion of the tongue down and inward; but some such distortion is an advantage, as the resilience of this tongue will hold the lever 11 on the pivot part 6 as seen in Fig. 8 until the head 20 is bent over as before described, and as seen in Fig. 9, where parts A and B are coacting to effect this bending, and may be an anvil and hammer, jaws of pliers, or analogous parts of some machine, as a press, for effecting this by power. The lid now is completed, ready to apply to the box.

When so applied, the nose 17 will lie in the slot 7 down against the upwardly facing engaging surface of the box bead 2, with the inner edge of the lever close to or against the side of the box 1 and having its lower tip 12 spaced out slightly from the box for ready engagement of the thumb or finger to swing the lower outer arm of the lever upward on its pivot means 6, which now has become approximately tubular as the tongue 10 was bent over inward with the neck 19 of the lever. This tongue is made long enough to form a major part of a circular cross section when so bent; being, as seen in Figs. 3 and 9, about 300°, which affords an ample bearing for the lever 11, and, extending out at both sides of the lever, affords an ample area of junction with the lip parts 5.

When the lever 11 thus is swung out, as in Figs. 2 and 3, the nose 17, down against the bead 2, forms a fulcrum, with the lever lifting against the lower complete side of the pivot part 6, which being part of the lid, results in prying the lid up on the adjacent side of the box; and, as is well known, if one side of the lid of such boxes is loosened, its complete removal then is easy. Such prying is familiar, where both lid and box have annular projections between which a coin or knife is inserted as the prying lever; but the prying engagement with those projections, which are convex, is difficult even with a straight edged instrument, as a knife, and almost impossible with a circular instrument, such as a coin. The opener, mounted on one of the members, obviates obtaining such an instrument, and constructed according to my invention, prying in an upright plane at a substantial angle to the sides of the container members, the lever works inward and downward, and cannot slip from the coacting projection. And with the ample pivot bearing, firmly supported by the extensive reinforced lip members, it can be depended upon for effective operation throughout the use of the container until empty, after a large number of opening operations.

In the modification of Figs. 10 to 14, inclusive, the box 1 is like that of the first example, and the lid 4' is similar to the lid of that example in having lip parts 5' extended materially around the lid rim, with the ribs 8 and 9 formed the same way. But the slot 7' continues outward, leaving the lip parts 5' distinct at their outer ends, which are formed into transverse channels 6' with upwardly extended tongues 10', thus resembling the single pivot part 6 of the other example. These channels 6' are longer transversely, however, with their remote ends beyond the adjoining ribbed lip edges when formed, as seen in Fig. 11. The tongues 10' are long enough to lap inward past the outer ends of the slot flanking ribs 9, and have their adjacent corners cut away, as at 21, to pass down along the adjacent ends of these ribs 9 as seen in Fig. 14, when bent over a wire pivot pin 22 lying in the channels 6' and passing through a hole in the lever 11' which, except for this hole, not opening out through the lever edge, is shaped the same as the lever 11 of the first example, and operates in the same manner when the lid is to be removed from the box, its relation to which, when closed, is seen in Fig. 13.

To prevent this pivot pin 22 from leaving the channels 6' endwise, it should be properly headed, which may be done in any well known manner. However, as seen in Fig. 12, after the parts are assembled, with the wire for the pin 22 of surplus length projecting at both ends, the projecting ends of the channels, before mentioned, and seen in Fig. 11, may be sheared off together with the wire, slightly bending or burring both pieces downward as at 23, thus producing a neat finish with the wire ends embedded in the channel ends. This permits the wire to be fed continuously, with the levers 11' to be slipped thereon, for the lid channels 6' to be slipped under the wire astraddle of the lever, and a compound die to close the tongues 10' over and then shear off the channel and wire ends, with a minimum of hand labor.

The example of Figs. 15 and 16 comprises a pivot support 5" formed separately from the lid 4" which is like those of the previous examples, fitting on a similar box 1, but having two integrally formed straps 24 on its rim. The support 5" is an upright channel with its open side toward the side of the lid 4" and having wings 25 extended out laterally up along the lid, with the straps 24 bent up outside the wings and over their upper edges and down between the wings and the lid; this being effected by laying the support 5" down along the straps 24, from the position of Fig. 16, bending the end parts of the straps back over the wings, and then bending the straps up at their junctions with the lid rim. The lower part of the front side of the support 5" has an upright slot 26, opening through its lower edge, and the lever 11" swings on a pivot pin 22" passed through the sides of the channel. The slot may be as wide as the space between the channel sides, allowing the lever to bear against these laterally. This lever has a finger engaging lug 27 up from its lower end on its outer edge, being otherwise similar to those of the previous examples in its formation to coact with the lid and box parts. Also, it will be understood that the levers of the other examples may have the lug 27 instead of the tip 12. Since the working strain is upward on the support 5", it may be used without special attachment of its upper part to the side of the lid, or it may be soldered thereto. This example is suited for larger heavier containers; the support 5" being adapted to be made of sheet metal much heavier than that of the lid, where a large lid may adhere to the vessel more strongly than its material would provide reactive resistance for if disposed as in the first two examples. However, it may be used for the lighter boxes, such as polish boxes, as before alluded to.

In any of the examples, the nose 17 of the lever would continue to swing downward and outward off the box head 2; and if the lid were reapplied with the lever in this position, the nose 17 then would be under the bead 2, locking the lid on the box at this side and locking the lever against removing action. This is prevented by the additional engaging means provided by the corner 14 at the top of the lever, which engages with the side of the lid as soon as the nose 17 has swung down far enough to dislodge the lid for easy removal, but before this nose 17 has passed out off the box bead 2, as seen best in Fig. 3. The levers 11′ and 11″ of Figs. 10 to 16, inclusive, with the simple pierced pivot hole, are formed initially to present this corner 14 for this limiting engagement; the lever 11 of Figs. 1 to 9, inclusive, is so formed that when bent as described, it will bring this corner into this disposition.

Examples have been given as best adapted for economical production, for small packages of goods that must be sold for a very low price, of which the cost of the opener must be only a very small fraction. The polish box is used for illustration as a very widely used container of that character. But the invention is applicable to other kinds of metal containers, as well as to containers of other materials, having lids of metal or other materials. For instance, jars of earthenware or glass may be made with beads similar to the bead 2, and have sheet metal lids provided with the opener the same as any of the examples of the box lid herein described, or according to other modifications thereof.

Under different conditions, therefore, modifications other than those illustrated or mentioned herein, either in design, proportion or arrangement of parts, or in the materials used, may occur in practice, and while certain constructional details are deemed preferable in connection with my invention, and I have shown and described these rather specifically in elucidating the construction and use of my invention, as is required, I do not wish to be understood as being limited thereto, but what I claim as new and desire to secure by Letters Patent is:

1. In combination with two members, one fitting into the other, the inner member having an engaging surface extending out past the outer member at a substantial angle to the adjacent sides of the members, a lever swinging on said outer member at a substantial angle to said sides and said engaging surface, with a part which lies across said engaging surface when the one member completely fits into the other member, whereby, when said lever swings, said part of the lever engages with said engaging surface substantially in the direction of relative separating movement of the members to effect a separation of said members.

2. In combination with a container having an upwardly facing engaging surface spaced down from its rim, a lid fitting down over said rim close to said surface, having transversely spaced lip parts projected out past said engaging surface, pivot means joining said parts together near their outer ends, and a lever swinging on said pivot means in an upright plane at a substantial angle to the adjacent side of the container, with an engaging part engaging down against said engaging surface, for raising said lid on said container.

3. In combination with a container having an upwardly facing engaging surface spaced down from its rim, a lid fitting down over said rim close to said surface, having transversely spaced lip parts projected out past said engaging surface, with ribs along their adjacent edges extending to the adjacent side of said lid, pivot means joining said parts together near their outer ends, and a lever swinging on said pivot means in an upright plane at a substantial angle to the adjacent side of the container, with an engaging part engaging down against said engaging surface, for raising said lid on said container.

4. In combination with a container having an upwardly facing engaging surface spaced down from its rim, a lid fitting down over said rim close to said surface, having transversely spaced lip parts projected out past said engaging surface, joining said lid along a curved line, each with a rib extending from near its outer end close to the remote end of its curved junction, pivot means joining said lip parts together near their outer ends, and a lever swinging on said pivot means in an upright plane at a substantial angle to the adjacent side of the container, with an engaging part engaging down against said engaging surface, for raising said lid on said container.

5. In combination with two members, one fitting into the other and having an engaging surface extending out past the outer member, a lever swinging on the outer member at a substantial angle to the adjacent sides of said members, with an engaging part to engage against said engaging surface for separating said members, and having another part angularly spaced from said engaging part, to engage with the adjacent side of this outer member before swinging out of engagement with said engaging surface of the inner member.

6. As a new and improved article of manufacture, a cup-shaped sheet metal lid having an outwardly extended integral lip joining its rim along a curved line and having lever pivot means formed near its outer extremity, the curved junction stiffening said lip in its support of said pivot means.

7. As a new and improved article of manufacture, a cup-shaped sheet metal lid having transversely spaced outwardly extended lip parts on its rim and pivot means joining the outer ends of said parts together for operative support of a lever to swing between said parts.

8. As a new and improved article of manufacture, a cup-shaped sheet metal lid having transversely spaced outwardly extended lip parts each joining its rim along a curved line, and pivot means joining the outer ends of said parts together for operative support of a lever to swing between said parts, the curved junctions of said parts stiffening said parts in their support of said pivot means.

9. As a new and improved article of manufacture, a lever in the form of a flat plate, having a recess opening out through one edge thereof to receive a pivot, and having its edges formed to provide parts separated by said recess, one of which parts is connected to the other around said recess by a comparatively narrow neck and is projected past the other part and is adapted to be brought close to said other part by bending said neck, to close said recess after receiving a pivot.

PETER LIGHT.